Oct. 24, 1950   C. H. OLDS   2,526,826
BIRD TRAP
Filed May 19, 1947

INVENTOR.
Charles H. Olds
BY
Ralph Burch
Attorney

UNITED STATES PATENT OFFICE 2,526,826

BIRD TRAP

Charles H. Olds, Prince George, British Columbia, Canada

Application May 19, 1947, Serial No. 749,015

1 Claim. (Cl. 43—92)

This invention relates to traps and particularly those of the spring jaw type suitable for trapping birds.

The principal object of the invention is the provision in combination with spring pressed jaws of a treadle operated trigger which is prominently mounted on the trap as a suitable perch for birds.

Another object is the provision of an extremely sensitive trigger release mechanism so that the jaws will be sprung upon the slightest contact of a bird with the perch or treadle.

An additional object is the provision of a more humane trap which will catch the birds around the throat rather than by the legs and so cause the instantaneous or almost instantaneous death of the trapped bird.

Another object is the protection of small birds which will not be caught as the large jaws will spring together above the bird.

Still another object is the provision of improved anchoring means whereby the trap can be mounted on a fence post, pole or the like by simply slipping the base on or off a large headed screw, bolt or similar device as will be hereinafter explained in detail.

Still other objects are to provide an efficient, inexpensive and durable trap of the character set forth.

With these and other objects in view that may appear while the description proceeds the invention consists in the novel construction, combination and arrangement of cooperating parts as hereinafter more specifically set forth, claimed and shown in the accompanying drawings forming part of this application and in which:

Figure 1:
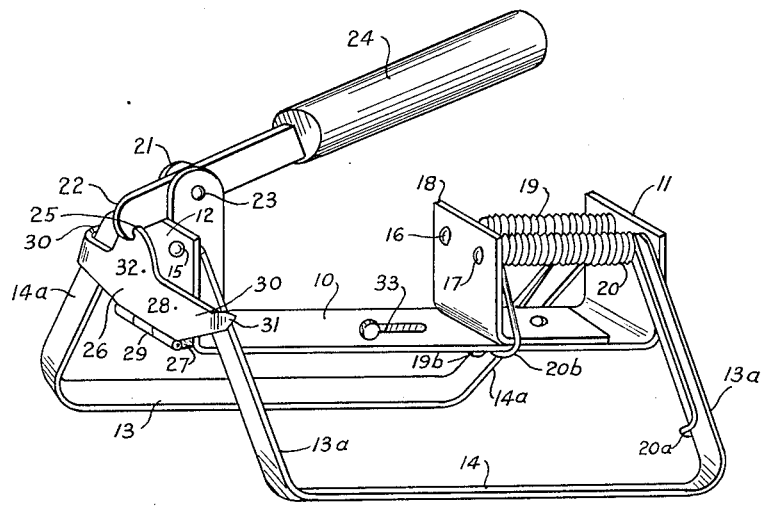
Fig. 1 is a perspective view of the improved trap in the set position.
Figure 2:
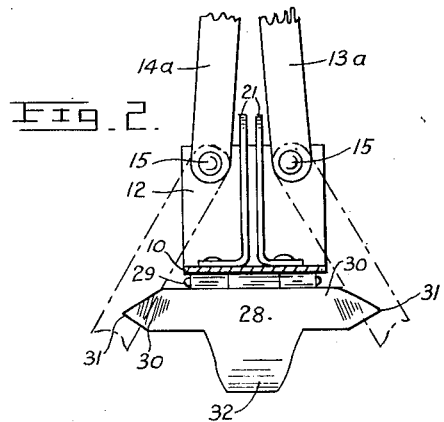
Fig. 2 is a sectional view of the trap, the section being taken between the trigger bracket and the spring bracket and facing toward the trigger mechanism, the trap has been sprung.

Referring more in detail to the drawings in which similar reference characters designate corresponding parts throughout the several views it will be seen the invention consists of a base plate 10 which is terminally provided with upstanding flanges 11 and 12. The jaws 13 and 14 are pivotally secured at the trigger end to the inner face of the upstanding flange 12 by means of rivets or bolts 15 located through said flange 12 and on which the jaws are loosely attached. The other ends of jaws 13 and 14 are rotatably inserted on spring pins 16 and 17 said rods 16 and 17 being riveted to upstanding flange 11 and to upstanding spring holder L-shaped flange 18.

The said jaws 13 and 14 are preferably U-shaped although they may be substantially semi-circular in shape and serve equally well. The leg portions 13a and 14a are relatively long so that when the trap is sprung the jaws meet well above the perch to catch the bird by the neck rather than by the legs. It is believed that this is clearly shown in Fig. 1, due consideration being given to the fact that the trap is illustrated in perspective. The face or meeting edges of the jaws may be plain or serrated as desired. At the extremity opposite to the trigger extremity is secured upon the base 10 an L-shaped bracket 18 provided with a pair of apertures therethrough, rods 16 and 17 are supported between L-shaped bracket 18 and upstanding flange 11 which have their extremities extending through the apertures in the said L-shaped bracket 18 and upstanding flange 11. A pair of coil springs 19 and 20 are disposed upon rods 16 and 17 and two extremities of the springs are extended to 19a and 20a to engage the jaws of the trap. The other extremities 19b and 20b are disposed under the base 10 of the trap. Each of the tips of the drawn out extremities are folded and bent around the jaws together when the trap is sprung. By securing the extremities of the springs around the jaws of the trap I prevent the extremities of the spring from inadvertently slipping off the jaw arm as is often the case when the spring ends merely abut against the sides of the jaws.

Secured to the upper face of base plate 10 at one end thereof between bracket 18 and upstanding flange 12 is a bracket 21 disposed longitudinally of the base plate 10. The bracket 21 consists of two L-shaped members arranged back to back in spaced apart relation to each other although any other suitable form may be adapted such as a U-shaped member for one example.

The trigger 22 is axially mounted at 23 in the bracket 21 and is provided with a suitable perch 24 immediately above the coil springs 19 and 20 so that the center of the jaws 13 and 14 meet above the perch when the trap is sprung. It will readily be observed that the perch provides an attractive and the only suitable landing place for a bird when the trap is mounted atop a pole or the like. It will also be observed that the perch is so disposed that when a bird alights thereon the trap jaws close immediately above and almost instantaneously capture and choke the bird or break its neck thus humanely capturing predatory birds.

When the trap is set, the trigger which is notched at 25 engages the catch generally referred to as 26. The catch consists of one plate 27 which is secured to the bottom face of the base plate 10 and the complementary plate 28 which freely swings about the axial hinge 29. The plate 28 has transversely extending arms 30 which are terminally provided with lugs 31 at right angles to the arm 30 and formed integral therewith. An outwardly flared trigger engaging tip 32 is disposed medially of the transverse arms.

To anchor the trap a keyhole aperture 33 is provided in the base 10 and a suitable bolt or screw secured in the top of a fence post or pole. The bolt is necessarily provided with a head which extends through the enlarged portion of the keyhole aperture after which the trap is slid along so that the bolt head is over the narrow slotted portion of the said aperture thus anchoring the slot in position.

The trap operates in the following manner:

To set the device the jaws are pressed downward and the catch 26 swung upward against the upstanding flange 12. The trigger is brought into engagement with the catch through the medium of the lip 32 by raising the perch as shown particularly in Fig. 1. In this position it will be seen that the arms 13a and 14a of the jaws bear against the lugs 31 and are prevented from swinging upward and closing by the said lugs. Conversely the force of the jaw arms against the lug prevent the catch from opening. The trap is sprung when the perch is forced down by the weight of a bird alighting on same; the opposite end of the trigger 22, is pivoted upward around the shaft 23 and the released catch 26 is directed in a descending arc around the hinge thus releasing the jaws which almost instantaneously spring together through the medium of the coil springs thus capturing the bird seated on the perch.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

A bird trap comprising a base plate having upstanding flanges at its ends, a pair of U-shape jaws pivotally mounted between the flanges of said base plate on opposite sides thereof, a bracket fixedly mounted on said base plate in spaced relation to one of said flanges, a pair of parallel rods supported by and disposed between said bracket and flange, coil springs mounted on each of said rods, one of the ends of each spring engaging the base plate and the other end engaging an arm of said jaws for urging the jaws to swing together above the base plate, a catch member hingedly connected to one end of said base plate having lateral arms provided with angularly bent lips at their ends for engaging over the arms of said jaws to hold the jaws in open position, upstanding bracket members mounted on said base plate adjacent said catch member and projecting above the flange of the base plate, a trigger arm pivotally mounted on said bracket members having a notched end for engaging and holding said catch member in engagement with said jaws, and a perch on the free end of said trigger disposed in vertical spaced relation to said base plate and below the path of movement of said jaws, adapted under the weight of a bird perched thereon to actuate said trigger to release said catch and allow the jaws to close.

CHARLES H. OLDS.

REFERENCES CITED

The following references are of record in the file of this patent:

UNITED STATES PATENTS

| Number | Name | Date |
|---|---|---|
| 879,668 | Olson | Feb. 18, 1908 |
| 1,585,568 | Soule | May 18, 1926 |
| 1,634,270 | Samouce | July 5, 1927 |
| 2,201,307 | Culbertson | May 21, 1940 |

FOREIGN PATENTS

| Number | Country | Date |
|---|---|---|
| 24,300 of 1929 | Australia | June 24, 1930 |